(12) United States Patent
Cato

(10) Patent No.: US 6,466,188 B1
(45) Date of Patent: Oct. 15, 2002

(54) DC-DC CONVERTER WITH CURRENT SENSING FOR USE WITH NON-LINEAR DEVICES

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,692

(22) Filed: Jan. 20, 2000

(51) Int. Cl.[7] .................................................. G09G 3/32
(52) U.S. Cl. ............................ 345/82; 345/39; 345/40; 345/61; 345/69; 345/83; 345/84; 345/102; 345/212
(58) Field of Search .............................. 345/82, 83, 84, 345/39, 40, 102, 69, 212; 349/61

(56) References Cited

U.S. PATENT DOCUMENTS 5,684,686 A * 11/1997 Reddy ......................... 363/97
5,841,648 A * 11/1998 Mansfield ..................... 363/59
6,044,231 A * 3/2000 Soshi et al. ................. 396/315
6,107,985 A * 8/2000 Walukas et al. ............ 345/102

OTHER PUBLICATIONS

Chester Simpson et al. "Programmable current source powers charger," *EDN Access*, Jun. 22, 1995, pp. 1–4, via Internet at http://archives.e–insite.net/archives/ednmag/reg/1995/062295/13di1.htm.

\* cited by examiner

Primary Examiner—Ulka J. Chauhan
Assistant Examiner—Jean Lesperance
(74) Attorney, Agent, or Firm—J. Bruce Schelkopf; Winstead Sechrest & Minick P.C.

(57) ABSTRACT

Provided is an electrical circuit that provides a boosting circuit that all in one provides a regulated step-up voltage to a non-linear device such as an array of light emitting diodes (LEDs) used in a liquid crystal display (LCD). The unique placement of the current sensing circuit within the boosting circuitry eliminates the need for a separate current regulating circuit, thus minimizing the circuitry needed to provide a constant back lighting LED array of constant luminosity.

18 Claims, 7 Drawing Sheets

US 6,466,188 B1

DC-DC CONVERTER WITH CURRENT SENSING FOR USE WITH NON-LINEAR DEVICES

TECHNICAL FIELD

The present invention relates generally to the field of DC to DC converters used with non-linear devices such as light emitting diodes (LED) in back lighting for liquid crystal displays (LCD).

BACKGROUND INFORMATION

Many crystal displays (LCDs) take advantage of light emitting diode (LED) back lighting technology. The LEDs are used to provide a back lighting source for the LCDs so that the displays may be more efficiently viewed. However, illuminosity of LEDs is sensitive to current fluctuations and is directly dependant upon the current flowing through the LEDs. Therefore, back lighting LED circuitry for LCDs must regulate the current flow through the LED to ensure a constant current during all operating conditions. thus providing a constant lighting source for the LCDs.

LEDs utilized for back lighting purposes are typically aligned in an array. FIG. 1 illustrates a block diagram of a typical circuit utilizing a LED array in the prior art. LED 101 is placed in series with a predetermined number of equivalent LED 101s. This multiple LED arrangement provides a stack 105 of four LEDs aligned in series. Those skilled in the art will understand the stack is not limited to four LEDs and that more or less than four LEDs may be used to achieve similar results.

Subsequent stacks 106 and 107 are placed in parallel with stack 105. Stacks 106 and 107 each have the same LED arrangement as stack 105, each stack consisting of the same number and type of LEDs. The parallel arrangement of stacks 105, 106 and 107 provides an LED array 110 for the back lighting of the LCD (not shown).

Power requirements of LEDs encourage the LEDs to be stacked in series, with each stack then placed in parallel with other stacks as shown in FIG. 1 in circuit 110. As diodes, LEDs require some voltage to forward bias the LED and permit proper operation of the light emitting aspect of the diode. Typical LEDs might require as much as 1.2 volts or more to forward bias the diode depending on the diode used. Thus, when four LEDs are connected in series as a LED stack 4.8 volts may be required to forward bias the stack. Additional circuit losses might force the voltage requirements of the stack to be as high as 8 volts to forward bias the LED stack. This level typically exceeds the standard voltage used in the display circuitry requiring a step-up or boosting circuitry to provide the additional voltage. Many in the art have solved this problem by using a DC-DC converter to step-up or boost the voltage available to the diode stacks. Thus, voltage source 125 is input to a DC-DC boosting converter 120 which typically provides a boosted voltage across the LED array 110. Current regulating device 130 senses the current across resistor 135 and regulates the current through LED array 110 in order to provide a constant current through display 110. Those skilled in the art will recognize that the arrangement of stacks 105, 106 and 107 along with the current limiting device 130 provide a constant voltage and current source across LED array 110, thus providing a constant illuminosity output of display 110. In this way, those skilled in the art will recognize that each LED will receive the same current flow as every other LED in the array 110, ensuring a constant luminosity across the LED array 110 for any given current flow.

FIG. 2 illustrates a traditional DC-DC converter 120 utilized in a boosting circuit to provide the necessary voltage needed for back lighting LEDs. Shown in FIG. 2 is a DC/DC converter control chip 203. DC/DC converter control chip 203 is a generic, standard DC/DC converter control chip such as Advance Micro Device's ADP 1110. Various inputs are needed for DC/DC converter control chip 203 to operate in its normal mode. Pin 1 235 is supplied with $V_{IN}$ 250 which may correspond to the bus voltage within the display. Additionally, DC/DC converter control chip 203 receives a feedback signal (FB) 245 at pin 3. The feedback voltage samples the voltage across a typical voltage divider resistor circuitry. The voltage divider circuitry consists of resistors 210 and 220. The DC-DC converter 120 compares the feedback voltage with a reference voltage determined by DC/DC converter control chip 203, internal to the DC-DC converter 120. The reference voltage source commonly used in DC-DC voltage converters varies from 0.22 volts to 1.245 volts or more.

Switch (SW) 230 at pin 2 regulates the current through inductor 202. By regulating the current through inductor 202, those skilled in the art will recognize that, in combination with rectifier 205 and capacitor 225, inductor 202 will operate to provide a boosted, $V_{BUS}$ 260 which is greater than $V_{IN}$. Using a resistor divider feedback circuitry, a constant $V_{BUS}$ 260 is maintained. Thus, a separate and distinct current regulating circuit as shown in FIG. 1, at 130, is needed to provide a constant current through the LEDs.

FIG. 3 provides an example of typical current regulating circuitry 130 utilized in a back light LED circuit in prior art circuits. In FIG. 3, a certain $V_{BUS}$ 260 is provided from DC-DC converter 120 as a constant voltage source to the current regulating circuit 130. Four LEDs 101 are placed in series to create LED stack 105 as described above in FIG. 1. Transistor 320 and low ohmic resistor $R_1$ 135 are placed in series with LED stack 105. Operational amplifier 330 senses the voltage across resistor 135 and compares the voltage across resistor 135 with a reference voltage 340 maintained by xenor diode 335 and resistors 336 and 338 which are aligned in a typical resistor divider network. When current flow through LED stack 105 varies from a predetermined range, those skilled in the art will recognize that Operational amplifier 330 will sense the current divergence by comparing the two voltages. If the current flow through the LED stack 105 is less than the predetermined value, the circuitry will bias transistor 320 on or off accordingly to maintain the proper current flow through LED stack 105. It is important to note that in the prior art example shown in FIG. 3, a constant voltage source 260 is provided as a $V_{BUS}$ as described above. Thus, the current regulating circuitry 130 directly affects the current flow through LED stack 105 without affecting the voltage 260.

Because LEDs tend to be non-linear resistive devices, a stack of LEDs is unable to be used in a voltage divider network in order to regulate the current through the stack. Stated another way, LED stack 105 cannot replace resistor 135, simply because of LED's non-linear characteristics do not allow for a predictive voltage to occur across a LED or LED stack. Thus, the voltage across a LED or LED stack cannot be used as the feedback voltage for a constant current output. Hence, in prior art solutions, a DC-DC converter 120 alone is unable to regulate the current through the LED back light display 110 to maintain a constant current through the LEDs. Thus, prior art solutions incorporated a separate current sensing circuit 130 electrically coupled to the DC-DC converter to regulate the current through the LED stack to within the proper limits to maintained the desired luminosity as described above. Using two separate circuits to provide the necessary voltage and current flow through the LED array 110 is inefficient because of the additional circuitry needed.

Thus, a need in the art exists for a simplified DC-DC converter/current regulating device that, all in one, provides the proper voltage range, while maintaining the required current needed to provide a constant luminescence in the back light LED art.

SUMMARY OF THE INVENTION

Accordingly, provided is a DC-DC voltage converting means that takes the input voltage and either boosts or bucks the voltage to an output voltage, the output voltage being placed across a LED array and low ohmic resistor, such that the voltage across the low ohmic resistor may be utilized as a feedback signal to control the output current, thus providing a constant current through the LED array. If the LED array demands it, an op amp is used to properly amplify the voltage sampled across the low ohmic resistor such that the output voltage from the op amp is within the specifications of the DC-DC converting circuitry.

Additionally, provided is a circuit comprising a DC-DC converting means for providing a boosted or bucked output voltage, the output voltage being provided to an electrical device connected in series with a current sensing means which provides a voltage feedback to the DC-DC converter, the voltage feedback being used to regulate the output voltage such that the current through the electrical device is constant within the data processing system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

For the most part, details concerning timing consideration and the like have been omitted inasmuch as such details are not necessary to obtain a complete understanding of the present invention and are within the skills of persons of ordinary skill in the relevant art.

Figure 4:
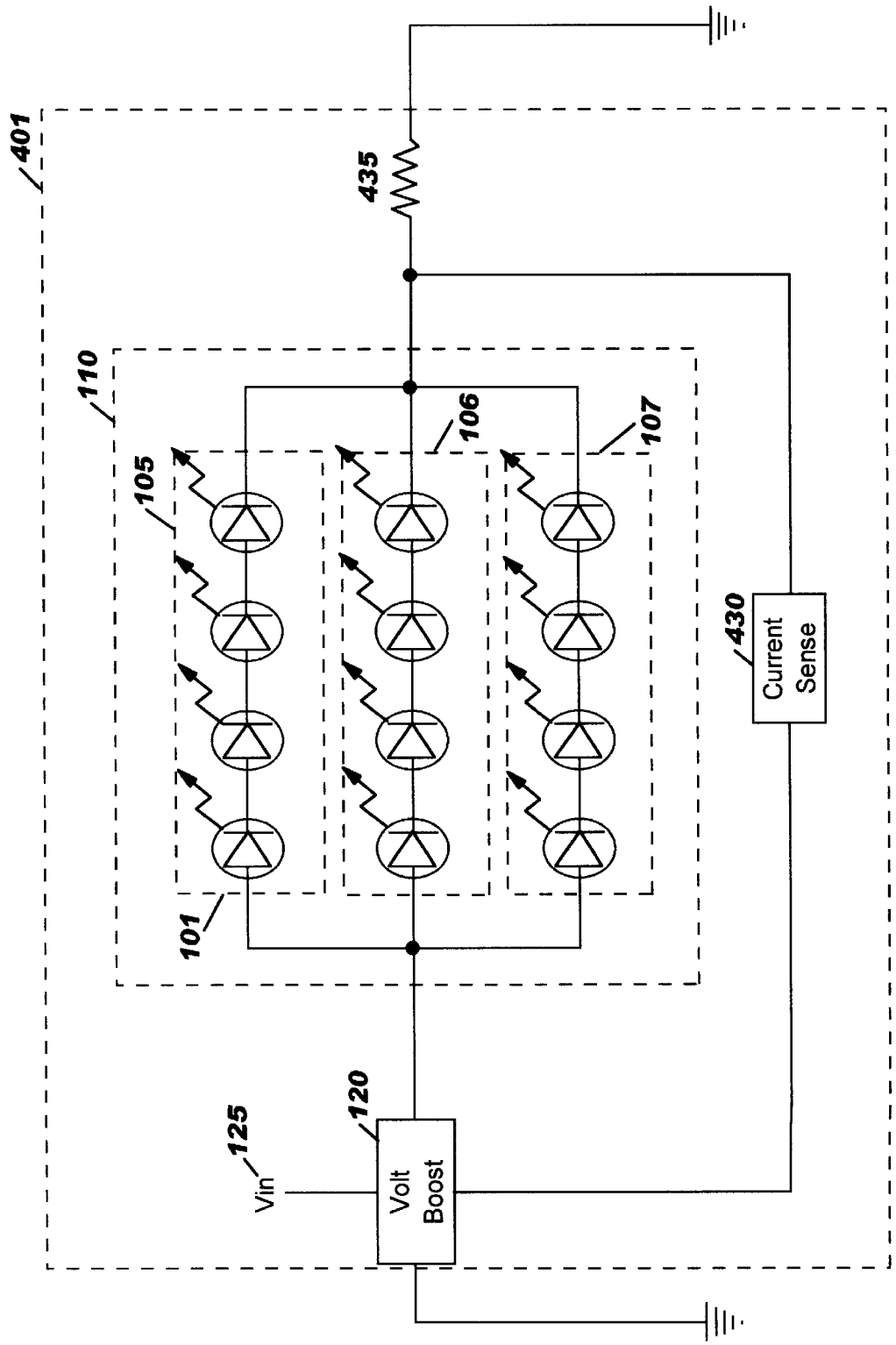
FIG. 4 illustrates a LED back light display circuitry utilizing an embodiment of the present invention.

Referring now to FIG. 4, there is illustrated a schematic drawing of one embodiment of the present invention 401. In FIG. 4, as described above, diodes 101 are arranged in series to create stack 105. Stacks 105, 106 and 107 are placed in parallel to create display 110. Additionally, display 110 receives a voltage from the voltage boosting circuit 120 which receives an input voltage 125. The present invention 401 provides a current sensing circuitry 430 which senses the current through low ohmic resistor 435 by sampling the voltage across resistor 435, and provides this sampled voltage as a feedback signal to the voltage boosting circuit 120. The operation of current sensing circuitry 430 will be described in more detail below.

Figure 1:
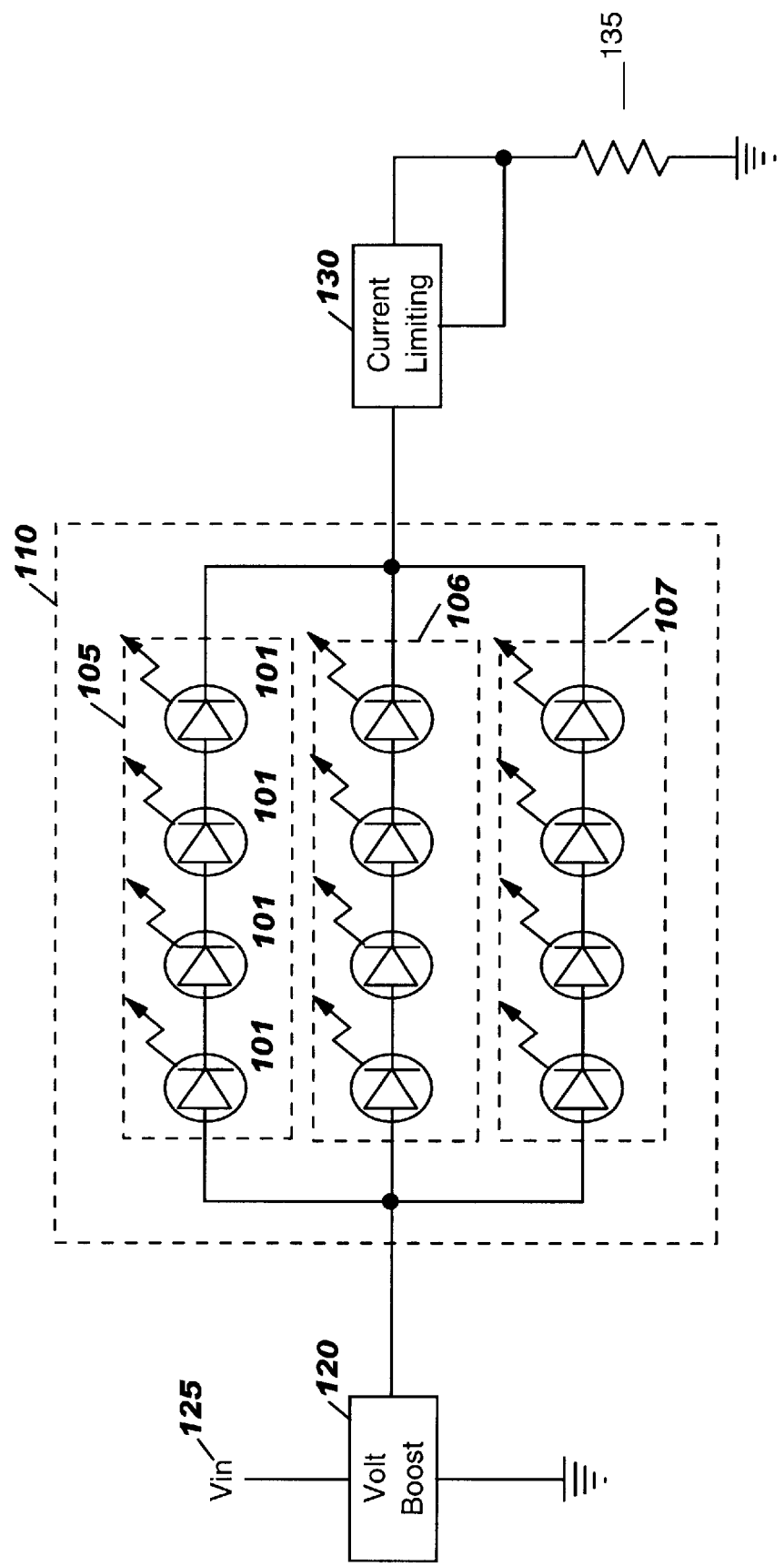
FIG. 1 illustrates a LED back light display circuitry used in the prior art.
Figure 2:
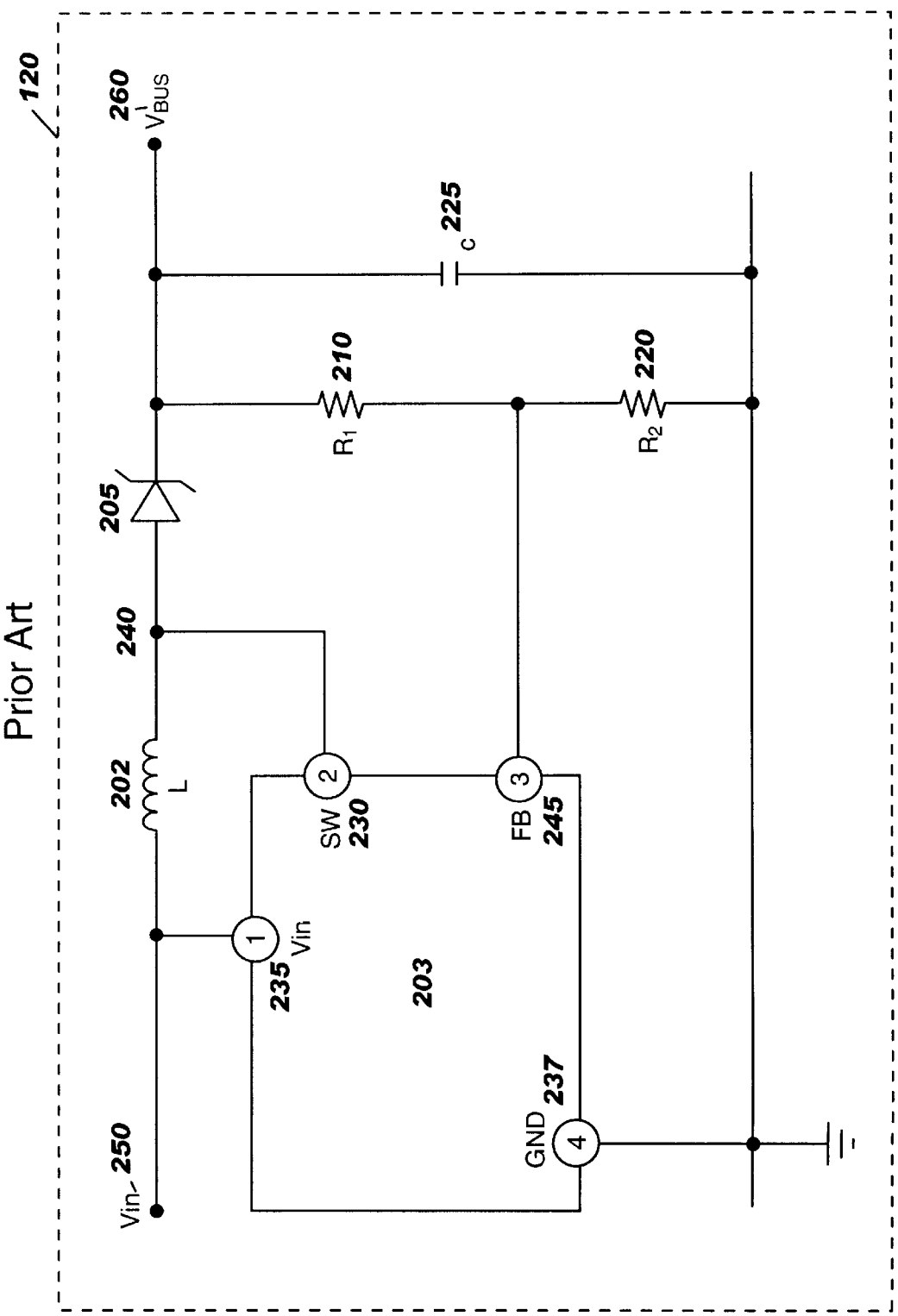
FIG. 2 illustrates a step-up or boosting DC-DC converter circuitry utilized in the prior art.
Figure 3:
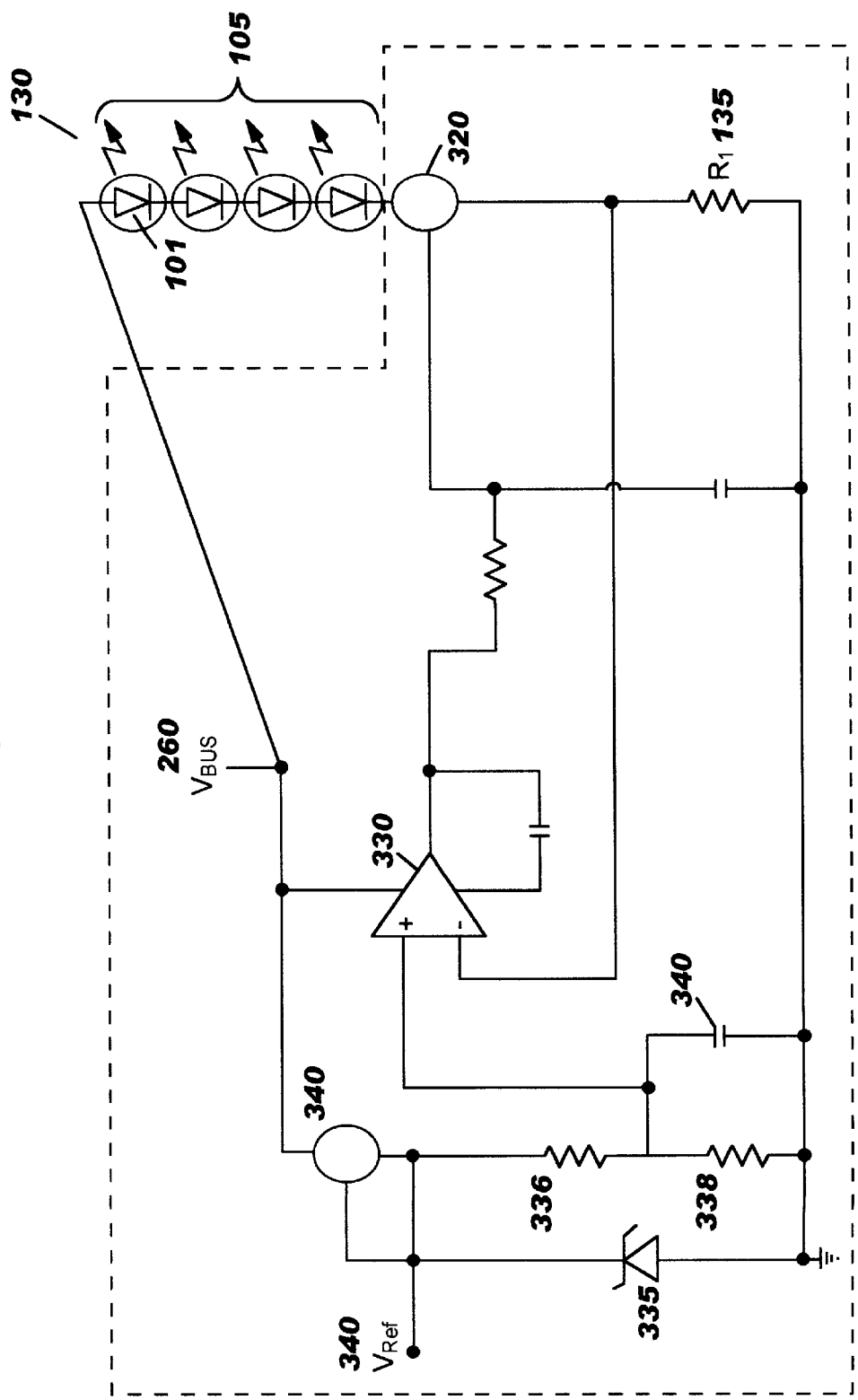
FIG. 3 illustrates a constant current regulating circuitry utilized in the prior art.
Figure 5:
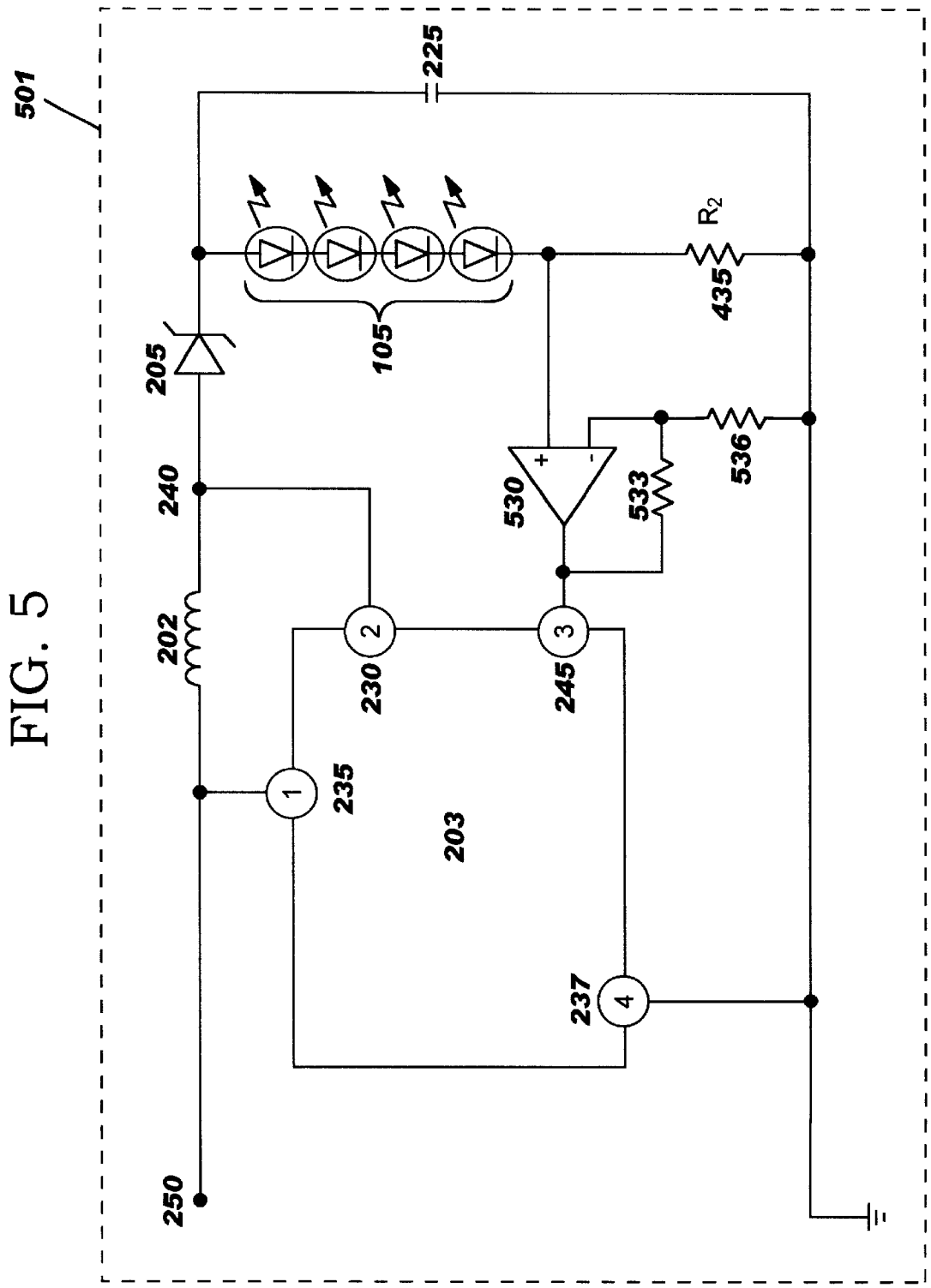
FIG. 5 illustrates a circuit diagram of an embodiment of the present invention.

Referring now to FIG. 5, there is illustrated a circuit diagram of one embodiment of the present invention. In FIG. 5, the step-up voltage current regulating device 501 is comprised of the generic step-up DC/DC converter control chip 203 shown in FIG. 2 in the prior art. 501 is a more detailed view of 401 in FIG. 4. The boosting or step-up operation of DC/DC converter control chip 203, inductor 202, rectifier diode 205, and capacitor 225 have been previously discussed in relationship to FIG. 2 and will not be repeated here for brevity. In FIG. 5, LED stack 105 consists of four LEDs placed in series with each other as described above.

The LED stack 105 is placed in series with resistor 435. Resistor 435 is a low ohmic resistor. The resistance of resistor 435 must be low enough as to maximize the voltage drop across LED stack 105. However, resistor 435 must be large enough to allow a voltage to be sampled across resistor 435. A resistor value of 0.27 ohms is used in the present example. The voltage across resistor 435 is used to provide a feedback voltage signal at input 245 to DC/DC converter control chip 203. However, because resistor 435 is a low ohmic resistor, the voltage across resistor 435 may not be within DC/DC converter control chip 203's voltage specification range. Thus, op amp 530 provides the necessary amplification of the voltage across resistor 435 such that DC/DC converter control chip 203 will be able to utilize it as a feedback signal 245. Resistors 533 and 536 are gain setting resistors for op amp. 530. In the present invention, op amp 530 senses the voltage at resistor 435 and amplifies it. DC/DC converter control chip 203 senses the feedback signal 245 from op amp 530 at pin 3. Those familiar in the art will understand that the feedback signal is utilized by DC/DC converter control chip 203 to control the current flow through the inductor at pin 2, point 230 as discussed above in FIG. 2.

If current flow through LED stack 105 varies, circuitry 501 will vary the voltage across LED stack 105 in order to minimize the current variance. For example, if current flow through LED stack 105 should drop because of temperature variances or system losses, then the voltage across resistor 435 will drop. Op amp 530 will sense the voltage across resistor 435 and amplify the voltage to a usable level and provide the amplified voltage as feedback signal 245 to DC/DC converter control chip 203. DC/DC converter control chip 203 will sense the drop in feedback voltage 245 by comparing it to a reference voltage determined by the characteristics of the DC/DC converter control chip 203 as described above, and operate to more rapidly switch the current on and off at point 240. By switching the current across inductor 202 more rapidly, those in the art will understand that a higher voltage is produced at across cap 225. This higher voltage provides the higher voltage across and correspondingly a higher current flow through LED stack 105, thus maintaining the proper current flow through LED stack 105.

In this way, unlike in the prior art where the output voltage or bus voltage was regulated by the DC-DC converting circuitry within a certain range, in the present invention the bus voltage across the LED stack 105 is allowed to float within the DC-DC converting circuitry, while maintaining the current flow across resistor 435. In this way, the voltage across the LED stack 105 is allowed to vary in accordance to the current needs of LED stack 105. By ensuring that the current flow through LED stack 105 remains within a constant range, circuitry 501, maintains a constant luminosity of stack 105 all within one circuit 501.

Figure 6:
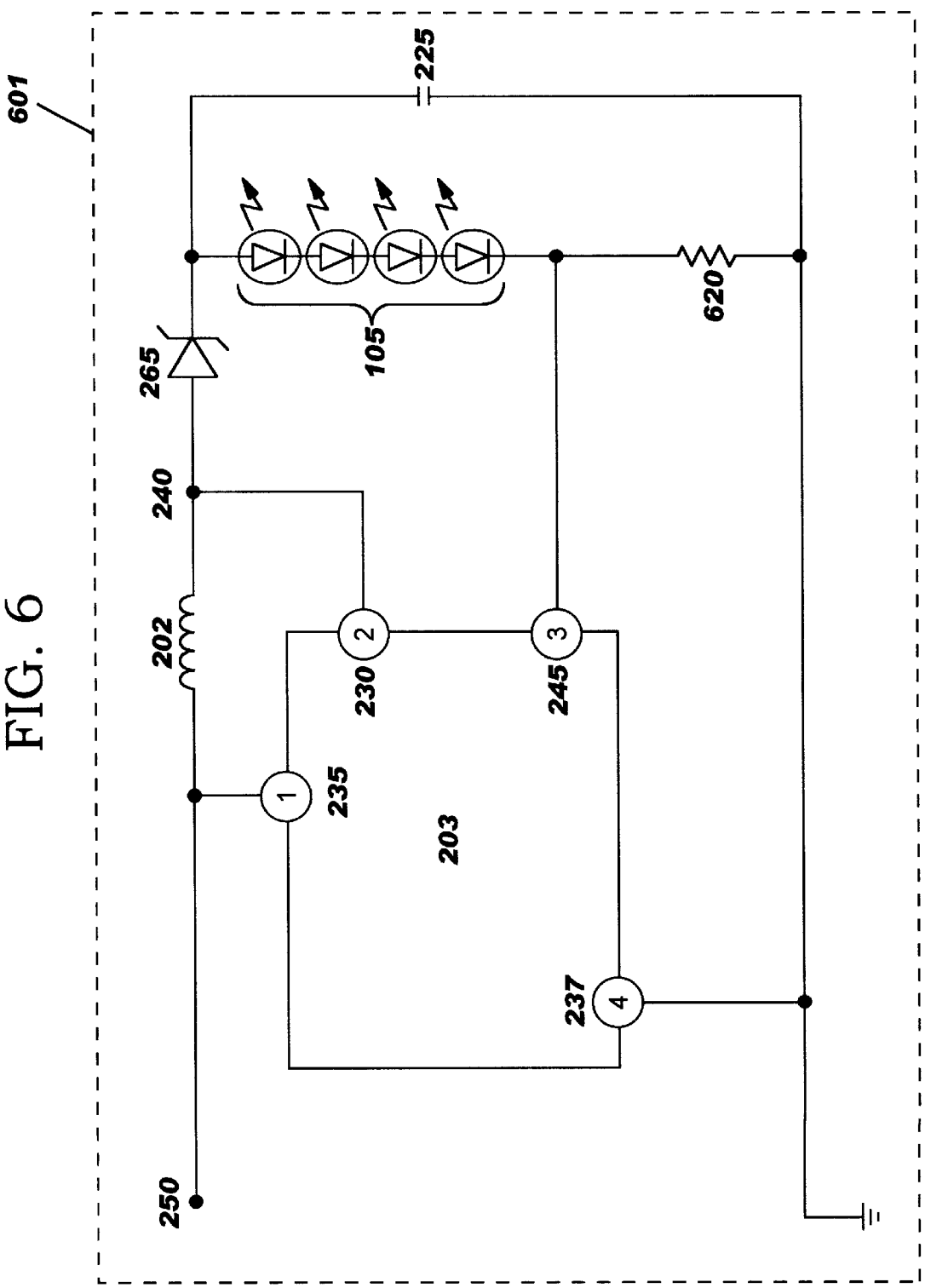
FIG. 6 illustrates a circuit diagram of another embodiment of the present invention.

Referring now to FIG. 6, there exists another embodiment of the present invention. FIG. 6 illustrates the circuitry as described in FIG. 5 with the exception that op amp 530 and its corresponding resistors 533 and 536 are removed from circuitry 501. Thus, circuitry 601 operates without the need of op amp 530. The deletion of this portion of the circuitry can occur when power consumption limitations allow for it. In other words, when input power available is such that resistor 435 can be increased to the point that the voltage across resistor 435 equals the reference voltage internal to the DC-DC converter, then op amp 530 is no longer needed. Thus, resistor 620 is a low ohmic resistor and function in a similar manner as resistor 435. However, because of power availability levels, the resistive value of 620 can be high enough to allow for the deletion of op amp 530 from the circuitry.

Figure 7:
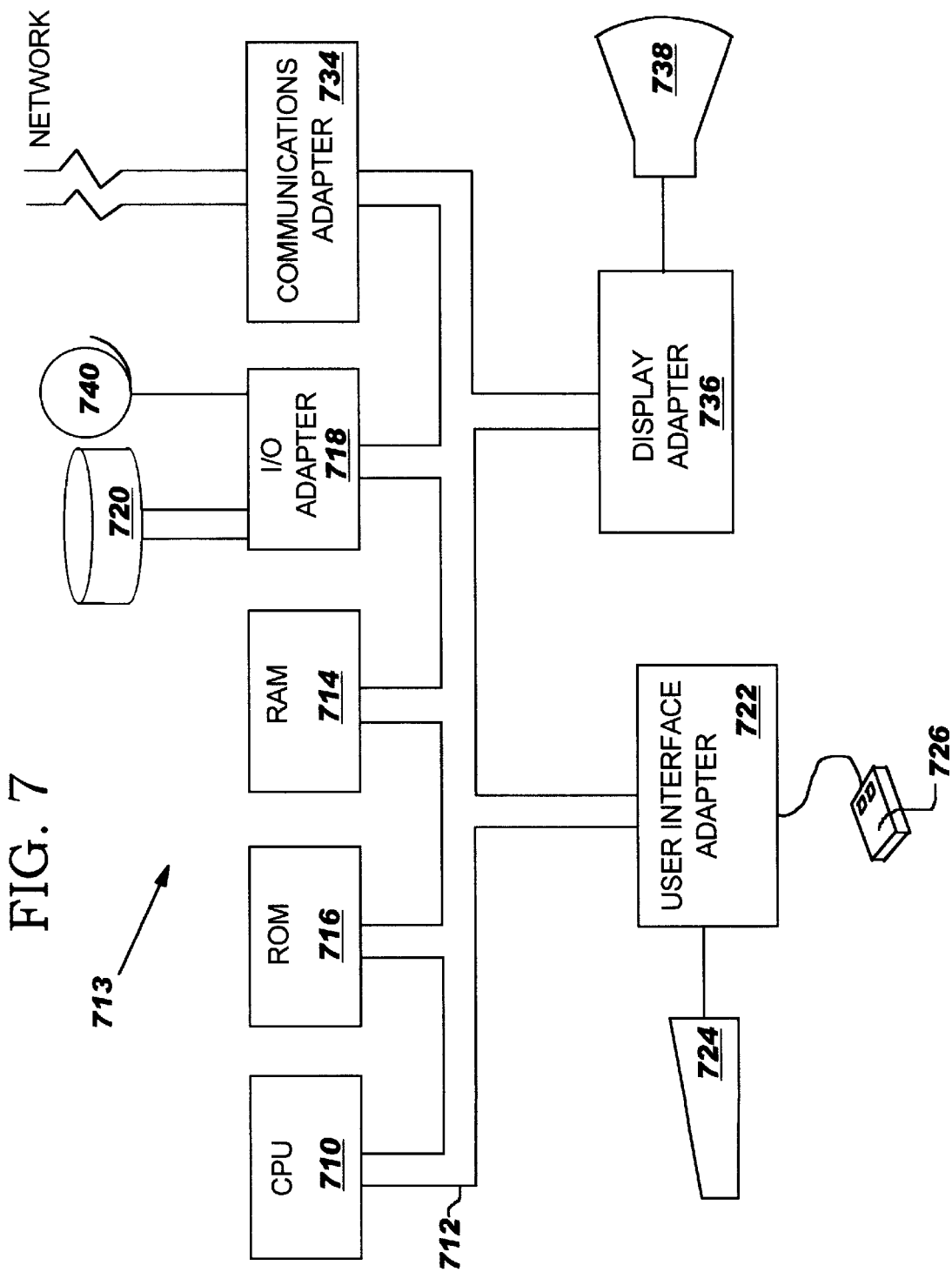
FIG. 7 illustrates a data processing system implementing an embodiment of the present invention.

A representative hardware environment for practicing the present invention is depicted in FIG. 7, which illustrates a typical hardware configuration of data processing system 713 in accordance with the subject invention having central processing unit (CPU) 710, such as a conventional microprocessor, and a number of other units interconnected via system bus 712. Data processing system 713 includes random access memory (RAM) 714, read only memory (ROM) 716, and input/output (I/O) adapter 718 for connecting peripheral devices such as disk units 720 and to bus 712, user interface adapter 722 for connecting keyboard 724, mouse 726, and/or other user interface devices such as a touch screen device (not shown) to bus 712, communication adapter 734 for connecting data processing system 713 to a data processing network, and display adapter 736 for connecting bus 712 to display device 738. The present invention, within data processing system 713, would be located within display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. An electrical circuit controlling a light output level of a back-light for a display comprising:
    a switching voltage regulator circuit for receiving an input voltage and generating an output voltage in response to a difference between a reference signal and a feedback signal; and
    a series coupled array of light emitting diodes (LEDS) generating said light output level, said array of LEDS having an array input terminal coupled to a first terminal of said output voltage and an array output terminal coupled to a first resistor terminal of a sense resistor, a second resistor terminal of said sense resistor coupled to a second terminal of said output voltage, a voltage drop across said sense resistor generating said feedback signal.

2. The electrical circuit of claim 1, wherein said switching voltage regulator circuit is a boost voltage regulator comprising:
    an energy storage inductor having a first inductor terminal coupled to said input voltage and a second inductor terminal;
    a diode having an anode coupled to said second inductor terminal and a cathode coupled to said array input terminal, said array input terminal generating said output voltage;
    an electronic switch coupled to said second inductor terminal; and
    regulating circuitry for gating said electronic switched ON and OFF in response to said difference between said reference signal and said feedback signal to modify said output voltage.

3. The electrical circuit of claim 1, wherein said display is a liquid crystal display (LCD).

4. The electrical circuit of claim 1, wherein said light output level is set by adjusting said reference voltage.

5. The electrical circuit of claim 1, wherein said output voltage is modified by said switching voltage regulator to maintain a set current level in said array of LEDS.

6. A method for controlling a light output level backlighting a display comprising the steps of:
    coupling in series an array of light emitting diodes (LEDS) to provide said light output level in response to a current through said array of LEDS, said array of LEDS having an input terminal and an output terminal;
    coupling said output terminal of said array of LEDS to a first resistor terminal of a sense resistor forming a feedback node, said resistor having a second resistor terminal;
    coupling an output voltage of a switching voltage regulator across said input terminal and said second resistor terminal, said switching voltage regulator receiving an input voltage and modifying said output voltage in response to a difference between a feedback signal and a reference signal; and
    controlling said light output level by coupling said feedback node to said switching voltage regulator, said feedback node generating said feedback signal.

7. The method of claim 6, wherein said switching voltage regulator circuit is a boost voltage regulator comprising:
    an energy storage inductor having a first inductor terminal coupled to said input voltage and a second inductor terminal;
    a diode having an anode coupled to said second inductor terminal and a cathode coupled to said array input terminal, said array input terminal generating said output voltage;
    an electronic switch coupled to said second inductor terminal; and
    regulating circuitry for gating said electronic switched ON and OFF in response to said difference between said reference signal and said feedback signal to modify said output voltage.

8. The method of claim 6, wherein said display is a LCD.

9. The method of claim 6, wherein said light output is set by adjusting said reference voltage.

10. The method of claim 6, wherein said output voltage is modified by said switching voltage regulator to maintain a set current level in said array of LEDS.

11. A display system with back-lighting comprising:
- a liquid crystal display (LCD) receiving said back-lighting;
- a switching voltage regulator circuit for receiving an input voltage and generating an output voltage in response to a difference between a reference signal and a feedback signal; and
- a series coupled array of light emitting diodes (LEDS) generating said back-lighting, said array of LEDS having an array input terminal coupled to a first terminal of said output voltage and an array output terminal coupled to a first resistor terminal of a sense resistor, a second resistor terminal of said sense resistor coupled to a second terminal of said output voltage, a voltage drop across said sense resistor generating said feedback signal.

12. The display of claim 11, wherein said switching voltage regulator circuit is a boost voltage regulator comprising:
- an energy storage inductor having a first inductor terminal coupled to said input voltage and a second inductor terminal;
- a diode having an anode coupled to said second inductor terminal and a cathode coupled to said array input terminal, said array input terminal generating said output voltage;
- an electronic switch coupled to said second inductor terminal; and
- regulating circuitry for gating said electronic switched ON and OFF in response to said difference between said reference signal and said feedback signal to modify said output voltage.

13. The display of claim 11, wherein said light output is set by adjusting said reference voltage.

14. The display of claim 11, wherein said output voltage is modified by said switching voltage regulator to maintain a set current level in said array of LEDS.

15. A data processing system comprising:
- a central processing unit (CPU);
- a random access memory (RAM);
- a display adapter;
- a display system coupled to said display adapter; and
- a bus system coupling said CPU to display adapter and said RAM, said display system comprising:
  - a liquid crystal display (LCD) receiving back-lighting;
  - a switching voltage regulator circuit for receiving an input voltage and generating an output voltage in response to a difference between a reference signal and a feedback signal; and
  - a series coupled array of light emitting diodes (LEDS) generating said back-lighting, said array of LEDS having an array input terminal coupled to a first terminal of said output voltage and an array output terminal coupled to a first resistor terminal of a sense resistor, a second resistor terminal of said sense resistor coupled to a second terminal of said output voltage, a voltage drop across said sense resistor generating said feedback signal.

16. The display of claim 15, wherein said switching voltage regulator circuit is a boost voltage regulator comprising:
- an energy storage inductor having a first inductor terminal coupled to said input voltage and a second inductor terminal;
- a diode having an anode coupled to said second inductor terminal and a cathode coupled to said array input terminal, said array input terminal generating said output voltage;
- an electronic switch coupled to said second inductor terminal; and
- regulating circuitry for gating said electronic switched ON and OFF in response to said difference between said reference signal and said feedback signal to modify said output voltage.

17. The display of claim 15, wherein said light output is set by adjusting said reference voltage.

18. The display of claim 15, wherein said output voltage is modified by said switching voltage regulator to maintain a set current level in said array of LEDS.

* * * * *